United States Patent [19]

Nakamura et al.

[11] 4,450,547

[45] May 22, 1984

[54] FOCAL POSITION DETECTING OPTICAL APPARATUS

[75] Inventors: Shigeru Nakamura, Hachioji; Takeshi Maeda, Kokubunji; Toshimitsu Kaku, Hachioji; Yoshito Tsunoda, Mitaka; Wasao Takasugi, Higashiyamato; Tokuya Kaneda, Odawara, all of Japan

[73] Assignee: Hitachi, Ltd., Tokyo, Japan

[21] Appl. No.: 313,218

[22] Filed: Oct. 20, 1981

[30] Foreign Application Priority Data

Dec. 26, 1980 [JP] Japan .................. 55-183911

[51] Int. Cl.³ .............................................. G11B 7/00
[52] U.S. Cl. ........................................ 369/45; 250/204
[58] Field of Search ............... 369/45, 46, 44, 109, 369/121; 358/342; 350/433; 250/201, 204

[56] References Cited

U.S. PATENT DOCUMENTS

| | | | |
|---|---|---|---|
| 4,123,652 | 10/1978 | Bouwhuis | 369/45 X |
| 4,273,998 | 6/1981 | Kanamaru | 369/45 X |
| 4,290,132 | 9/1981 | Kotaka | 369/45 |
| 4,293,944 | 10/1981 | Izumita et al. | 369/45 |

Primary Examiner—Robert L. Richardson
Attorney, Agent, or Firm—Antonelli, Terry & Wands

[57] ABSTRACT

A focal position detecting optical apparatus wherein a light beam focused by a first optical system is irradiated on an object to be illuminated, focal point images are formed at two foci spaced apart from each other by a cylindrical lens disposed in a path of light beam reflected from the object, and a shielding element having a tip edge making an angle of approximately 45° with an operating axis of the cylindrical lens is inserted at a site between the two foci and at which the light beam has a circular cross section to extract a portion of the light beam travelling between the two foci. The extracted portion is detected by two photodetectors disposed symmetrically with an axis lying in substantially the same direction as the tip edge, and the difference between outputs of the two photodetectors is produced for detection of an actual focal position of the first optical system.

20 Claims, 39 Drawing Figures

FOCAL POSITION DETECTING OPTICAL APPARATUS

BACKGROUND OF THE INVENTION

The present invention relates to a focal position detecting optical apparatus which is adapted to detect the displacement between an actual focal position of beams of light focused by an optical system and a desired focal position and which in particular is suitable for use in an automatic focal position adjuster for the optical system of an optical microscope, an optical disc recording and reproducing apparatus or the like.

In recent years, vigorous activity has been directed to developing a so-called optical disc recording and reproducing apparatus in which information, such as video signals, voice signals, electronic computer data or the like, is recorded on and reproduced from a disc at a high density by using light, especially, a laser beam. In such an optical disc recording and reproducing apparatus, laser beam emitted from a light source is required to be focused to a fine beam spot of about 1 $\mu$m diameter on the disc by means of an optical system with an objective lens in order for the information to be recorded and reproduced.

Actually, however, it is impossible to obtain a disc surface plane of optical completeness and the disc surface is more or less distorted. In addition, because of eccentricity of the shaft of the turntable carrying the disc, the rotating disc surface vibrates axially with an amplitude of several tens of microns to several hundreds of microns, thus making it impossible to always maintain the correct positional relationship between the objective lens and the disc. As a result, the beam spot projected on the disc greatly changes in its diameter. Accordingly, it is of importance to detect the displacement between a focal point of a light beam focused by means of the objective lens and the disc so as to make it possible to always maintain the correct positional relationship between the objective lens and the disc.

According to a conventional apparatus for detecting the focal position, beams of light focused by a first optical system are projected on an object to be illuminated, a light beam for focal point detection which is derived out of light reflected from or transmitted through the object is received by a photodetector through a second optical system, and changes in density of the focal position detection light beam are detected to determine a displacement between the first optical system and the object. Although the light reflected from the object to be irradiated is herein utilized for the focal point detection light beam, the transmitted light may be utilized for the same from a similar technical standpoint of view.

Figure 1:
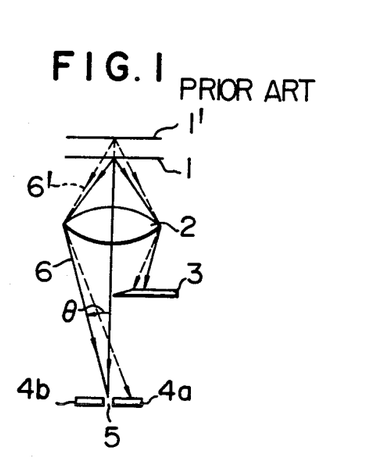
FIG. 1 is a diagram to explain the operation of a conventional apparatus.
Figure 2A:
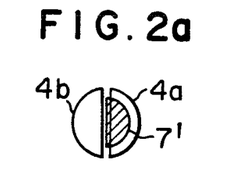
FIGS. 2a to 2c are diagrams useful in explaining light beam patterns formed on photodetectors in the apparatus of FIG. 1.
Figure 2B:
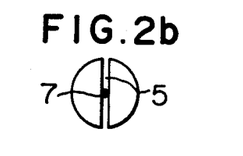
Figure 2C:
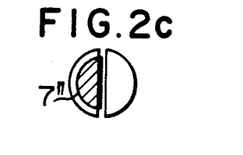
Figure 3:
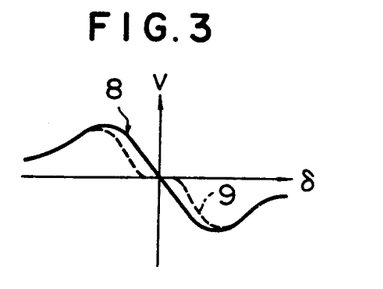
FIG. 3 shows waveforms of detection signals obtained with the FIG. 1 apparatus.
Figure 4:
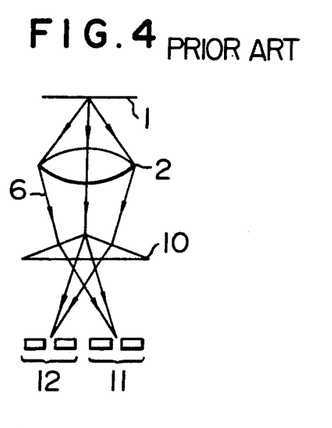
FIG. 4 is a diagram to explain the operation of another conventional apparatus.

FIG. 1 illustrates one example of a conventionally known detecting apparatus. In the figure, the first optical system adapted to focus beams of light incident upon the object to be illuminated is not illustrated. This holds true for FIGS. 4, 5, 8, 16 and 17. When the focal point of the first optical system is settled at a desired position 1, a detection light beam as shown by solid line 6 passes through a lens 2 and a portion of the detection light beam which is not shielded by a mask 3 is focused on a gap 5 between photodetectors 4a and 4b, thus forming a focal point image. FIG. 2b illustrates a light beam pattern 7 (focal point image) formed on a plane of the photodetectors 4a and 4b under this condition. When the focal position is displaced as shown at 1' in FIG. 1, the light beam is concentrated on the photodetector 4a as shown by dotted line 6' so that a light beam pattern as shown at 7' in FIG. 2a is formed. A light beam pattern as shown at 7" in FIG. 2c is formed when the focal position is displaced toward the lens 2. Solid line curve 8 in FIG. 3 represents the difference V between outputs of the photodetectors 4a and 4b in relation to displacement $\delta$ of the focal position and is termed an S curve. The size of the focal point image 7 is of the order of a ratio $\lambda$/N.A., where N.A. is sin $\theta$ for an incident angle $\theta$ of the focused beam 6 shown in FIG. 1 and $\lambda$ is its wavelength. Taking $\lambda$=0.83 $\mu$m and N.A=0.1 for instance, the size is then about 10 $\mu$m. The detectors 4a and 4b are usually integral and the gap 5 called a dark slit has a width which is made equal to the width of the focal point image 7 obtained by the known apparatus. If the dark slit width is different from the width of the focal point image 7, a region in which irradiations on the photodetectors 4a and 4b are equal occurs when the actual focal point falls forwardly or rearwardly of the desired focal point to provide an S curve as shown by dotted line curve 9 in FIG. 3, thus preventing the detection near the desired focal point. Accordingly, in the conventional apparatus high accuracies are required for designing the detector dark slit width and in setting positions of the detectors. Even with an alternative as shown in FIG. 4 wherein an optical wedge 10 substitutes for the mask 3, as in the first conventional apparatus, requirements of high accuracies are encountered in designing the dark slit width in connection with paired detectors 11 and 12 and setting their positions.

Figure 5:
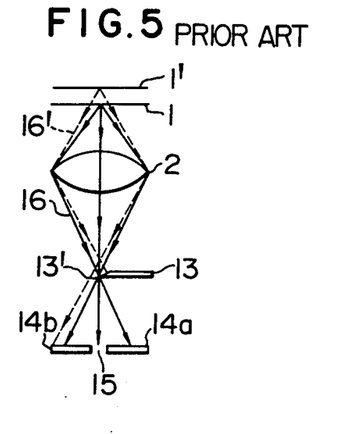
FIG. 5 is a diagram to explain the operation of yet another conventional apparatus.
Figure 6A:
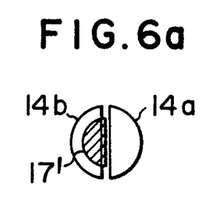
FIGS. 6a to 6c are diagrams useful in explaining light beam patterns formed on photodetectors in the apparatus of FIG. 5.
Figure 6B:
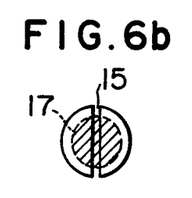
Figure 6C:
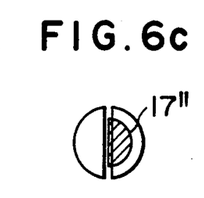
Figure 7:
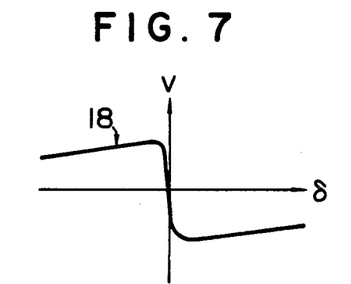
FIG. 7 shows a detection signal obtained with with FIG. 5 apparatus.

FIG. 5 shows a second example of a known apparatus. When the actual focal point is coincident with a desired focal position 1, a light beam as shown at solid line 16 is refracted by a lens 2 and focused at a tip 13' of a mask 13 to form a focal point image, finally reaching detectors 14a and 14b to form a light beam pattern as shown at 17 in FIG. 6b on surfaces of the detectors 14a and 14b. When the actual focal point is displaced, as shown at 1', from the desired focal position 1 in a direction away from the lens 2, a light beam as shown at dotted line 16' is focused at a site which is closer to the lens 2 than to the mask tip 13', a portion of the light beam directed to the detector 14a is shielded by the mask 13, and only the remaining portion directed to the detector 14b is received thereby. FIG. 6a illustrates a light beam pattern 17' formed on the surfaces of the detectors 14a and 14b under this condition. FIG. 6c depicts a light beam pattern 17" as formed on the detector surfaces when the actual focal point is displaced from the desired focal point toward the lens 2. Solid curve 18 in FIG. 7 is an S curve as obtained with this known apparatus. In this conventional apparatus, constraints on design of the width of a gap 15 (dark slit width) in the integral detectors 14a and 14b and on the setting of their positions are not so critical as in the first known apparatus because this known apparatus is not used normally for detecting the displacement of so a large focal position or length that is provided by a focal point image of the detection light beam formed on the surfaces of the detectors. However, for the desired focal position 1, the focal point image is formed at the tip 13' of the mask 13 to increase the likelihood of light beam scattering, with the result that higher accuracies than those required for the setting of detector positions in the first conventional apparatus are required in order for the inserting position of the mask 13 to be so determined as to cause equal irradiation on the detectors 14a and 14b. Further, since the light beam patterns on the surfaces of the detectors 14a and 14b are inverted when the actual focal point is forwardly or rearwardly of the desired focal point 1, sensitivity for detection of the desired focal point is unnecessarily high as shown by solid line curve 18 in FIG. 7, making it difficult to correct the focal position with the known apparatus. This is because motion of the element to be moved for correction of the focal point tends to pass by a desired position.

SUMMARY OF THE INVENTION

This invention contemplates elimination of these problems. According to the invention, optical means acting as a unidirectional lens which forms two foci spaced apart from each other is inserted in a light path of a detection light beam, a shielding element for extracting a portion of the detection light beam is inserted between the two foci of the light beam, and photodetectors are positioned to receive beams of the detection light passing through the two foci. The optical means acting as the unidirectional lens and inserted in the light path of the detection light beam gives focal point images astigmatism to enlarge the apparent area of the foci. As a result, tolerance of accuracies in setting the position of the shielding element for extracting the portion of the detection light beam can be enlarged to facilitate positioning of this element. In addition, by positioning the shielding element such that its tip is oriented in a direction which is different from both an operating axis of the unidirectional lens and an axis orthogonal thereto, it is possible to prevent the entire detection light beam from being concentrated and scattered at the tip of the shielding element. Further, since the light beam pattern on the surfaces of the detectors is rotated in accordance with changes in the actual focal position owing to the provision of the shielding element between the two foci, a desired detection sensitivity can be obtained.

DESCRIPTION OF THE PREFERRED EMBODIMENTS

Figure 8:
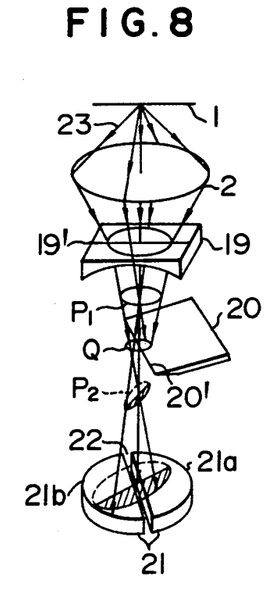
FIG. 8 is a schematic diagram showing one embodiment of the invention.

Referring now to FIG. 8 showing the essential part of one embodiment of the invention, a light beam 23 from a desired focal position 1 is refracted by a lens 2 and travels to be focused at a point $P_1$. As the light beam passes through a unidirectional lens 19 (in the form of a concavo-cylindrical lens in the illustrated embodiment), a portion of the light beam passing through a sectional area which contains the light beam center axis and which is in parallel with an operating axis 19' of the unidirectional lens 19 travels to be focused at a point $P_2$. The light beam to be focused at the point $P_1$ passes through a sectional area which is orthogonal to the former sectional area. A mask 20 is positioned at a site Q which lies between the points $P_1$ and $P_2$ and at which the light beam has a circular cross section in such a manner that a mask tip edge 20' is inserted to reach the light beam center while making half a right angle with the operating axis 19' in the plane which contains the circular cross section. The half of light beam which is not blocked off by the mask 20 forms on the surface of a detector set 21 an approximately semi-circular light beam pattern which is rotated through about 90° so that shadow of the mask tip edge 20' makes a right angle with the edge 20'. The detector set 21 is oriented such that a gap 22 (dark slit) between detectors 21a and 21b lies in substantially the same direction as the mask tip edge 20'. The detectors 21a and 21b are substantially symmetrical with the dark slit 22.

Figure 9:
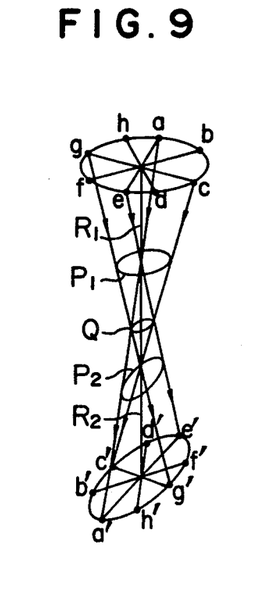
FIG. 9 is a diagram to explain light beam paths in the embodiment of FIG. 8.

To describe the focal position detecting operation in the invention with reference to FIG. 9, when the mask 20 is not inserted, the light beam passing by the two foci $P_1$ and $P_2$ shown in FIG. 8 travels as shown in FIG. 9. For simplicity of explanation, the light beam is represented by 8 radiations spaced apart by 45°, of which four radiations are illustrated by arrowed solid lines.

Figure 10A:
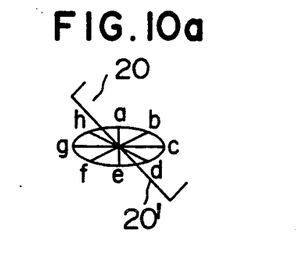
FIGS. 10a and 10b are diagrams useful in explaining a light beam cross section at a mask position and a corresponding light beam pattern formed on photodetectors obtained with the spot positioned at a closer defocusing zone to the exact focusing plane.
Figure 10B:
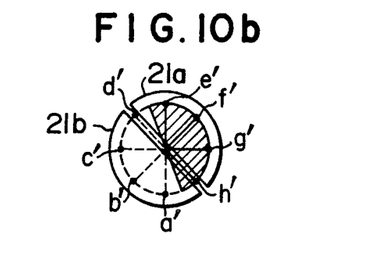
Figure 11A:
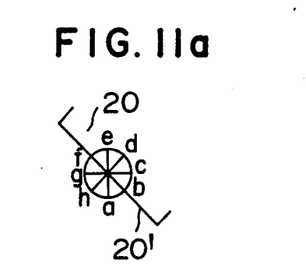
FIGS. 11a and 11b are similar diagrams obtained with the spot positioned at an exact focusing plane.
Figure 11B:
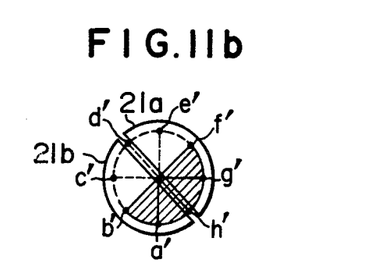
Figure 12A:
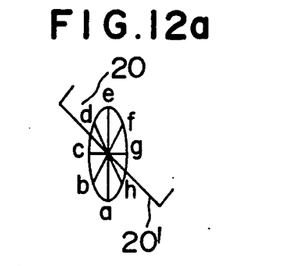
FIGS. 12a and 12b are similar diagrams obtained with the spot positioned at a farther defocusing zone to the exact focusing plane.
Figure 12B:
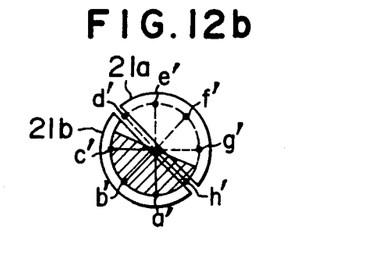
Figure 13:
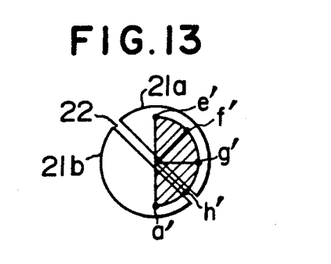
FIG. 13 is a diagram useful in explaining a light beam pattern obtained with the similar spot position as FIG. 11b.
Figure 14:
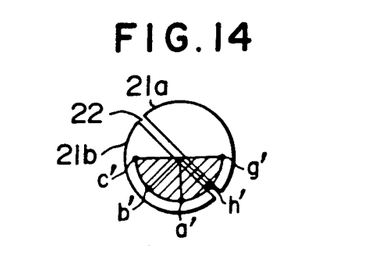
FIG. 14 is a similar diagram obtained with the similar spot position as FIG. 12b.
Figure 15:
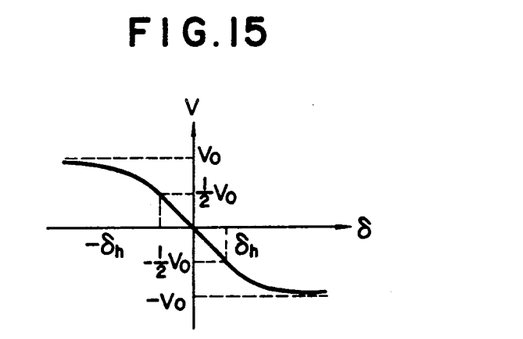
FIG. 15 shows a detection signal obtained with the FIG. 8 embodiment.

Radiations a and e are focused at the point P$_1$ to reach points a', e'. Radiations c and g are focused at the point P$_2$, reaching points c' and g'. Radiations b, d, f and h reach points b', d', f' and h', respectively. The points a', b', c', d', e', f', g' and h' lie on an approximate circle in the rear of the point P$_2$. The light beam has a circular cross section at the site Q. When viewing the respective radiations on the light beam cross sections which make progress in the light beam travelling direction, the radiations are arranged as shown in FIG. 10a at site R$_1$ which is closer to the unidirectional lens than to the point P$_1$, they are arranged as shown in FIG. 11a at site Q, and they are arranged as shown in FIG. 12a at site R$_2$ which is closer to the detectors than to the point P$_2$. As has been explained with reference to FIG. 8, when the mask 20 is inserted at site Q, radiations e, c and d in FIG. 11a are shielded and a line connecting radiations f and b coincides with the tip 20' of the mask 20, thus forming a light beam pattern as hatched in FIG. 11b on the surfaces of the detectors 21a and 21b. When the actual focal position is displaced from the desired focal position 1 toward the lens 2, the two foci P$_1$ and P$_2$ of the detection light beam are caused to displace relative to the mask 20 toward the detector set 21, followed by the same effect as obtained when the mask 20 is inserted at site R$_1$ in FIG. 9. Under this condition, radiations a, b, c and d are shielded by the mask 20 as shown in FIG. 10a, forming a light beam pattern as hatched in FIG. 10b on the surfaces of the detectors 21a and 21b. When the actual focal position is displaced from the desired focal position 1 away from the lens 2, the two foci P$_1$ and P$_2$ of the detection light beam are caused to displace relative to the mask 20 toward the unidirectional lens 19, followed by the same effect as obtained when the mask 20 is inserted at site R$_2$ in FIG. 9. Under this condition, radiations d, e, f and g are blocked off as shown in FIG. 12a, forming a light beam pattern as hatched in FIG. 12b on the surfaces of the detectors 21a and 21b. Further, under the condition that the actual focal position is displaced from the desired focal position toward the lens 2 making the focus P$_1$ of the detection light beam coincident with the site of the mask 20, it follows that a light beam pattern formed on the detector surfaces takes the form of a semicircle as defined by points a', e', f', g' and h' wherein a line connecting points a' and e' makes half a right angle with the dark slit 22 of the detector set 21 as shown in FIG. 13. In this case, the detection signal output V as defined by the difference Va−Vb between signal outputs Va and Vb of the detectors 21a and 21b is written as, V=½Vo, where Vo is the magnitude of an output signal generated when the semi-circular detection light beam pattern is formed on one of the detectors 21a and 21b alone. Under the condition that the actual focal position is displaced from the desired focal position 1 away from the lens 2 and the focus P$_2$ of the detection light beam coincides with the site of the mask 20, a light beam pattern on the detector surfaces takes the form of a semi-circle as defined by points c', g', h', a' and b' wherein a line connecting points c' and g' makes half a right angle with the dark slit 22 of the detector set 21 as shown in FIG. 14 to produce the detection signal output V which is −½Vo. As shown in FIG. 15, the aforementioned two states wherein the straight line segment of the semi-circular light beam pattern on the detector surfaces makes half a right angle with the dark slit are established at focal displacements of ±δh, and within the range of +δh to −δh, the rotation angle is approximately in proportion to the focal displacement and the S curve is substantially linear within this range. Since the two states corresponding to the focal displacements ±δh can easily be designed on the basis of geometrical optics, a desired S curve can be designed with ease. This is one of significant advantages of the invention.

Figure 16:
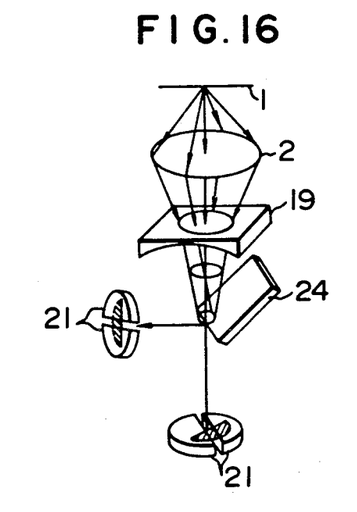
FIGS. 16 to 19 are diagrams showing other embodiments of the invention.
Figure 17:
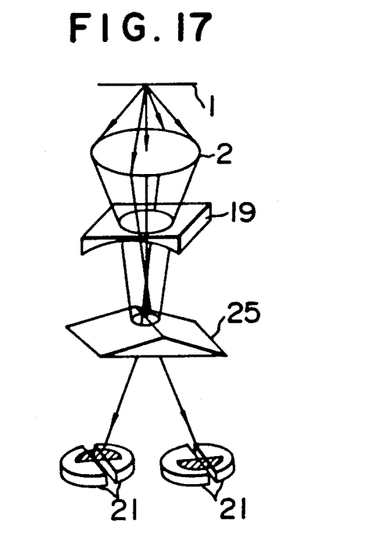
Figure 18A:
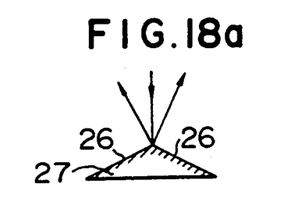
Figure 18B:
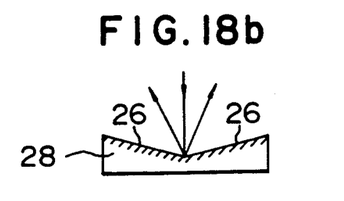
Figure 19:
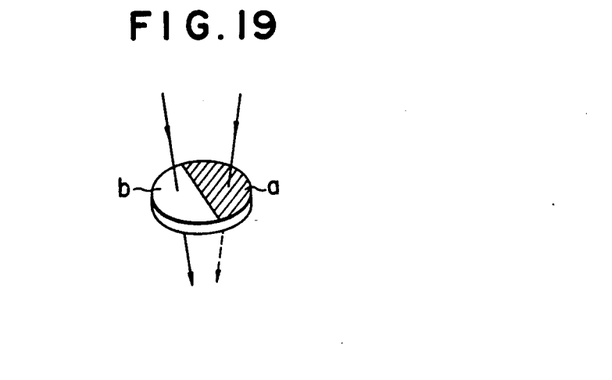

The unidirectional lens exemplified as concavo-cylindrical lens in FIG. 8 may obviously be replaced with a convexo-cylindrical lens. Also, in place of the mask 20 of complete light beam shielding capability as exemplified for simplicity of explanation, an element with two areas of different light transmittivity bounded by a straight line segment equivalent to the tip 20' of the mask 20, that is to say, an element such as a semi-transparent plate may be used. The detection light beam may be split into two sub-beams by using a mirror 24 as shown in FIG. 16, an optical wedge 25 (wedge prism) as shown in FIG. 17, or V-block reflector element 27 or 28 having a double reflection surface 26 as shown in FIG. 18a or 18b. In this case, both the split sub-beams may be used for the focal position detection; or alternatively, one sub-beam may be used for the focal position detection with the other used for obtaining different information. Further, an element as shown in FIG. 19 may also be used which has an area a coated with an optical semi-transparent film so that light transmittivity is made different at areas a and b. It is not always necessary to insert the element, such as a mask, mirror or wedge prism, which is adapted to extract a portion of the light beam until the straight line segment defining the boundary for different light transmittivities or splitting the light beam coincides accurately with the center of the detection light beam. While excessive insertion leads to formation of a light pattern of an arc which is smaller than the semicircle on the detector surfaces, slight insertion leads to a light pattern of an arc which is larger than the semicircle.

Figure 20:
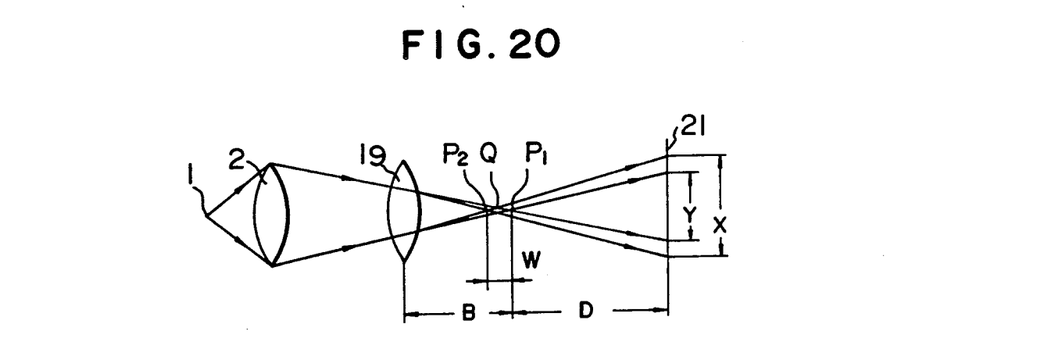
FIG. 20 and FIGS. 21a and 21b are diagrams useful in explaining angular direction setting in the photodetectors of the invention.

Although the light beam pattern on the detector surfaces was described as taking the form of the semi-circle in the foregoing description, it actually takes the form of a semi-ellipse due to the effect of the unidirectional lens. With reference to FIG. 20, it is assumed that beams of light emitted from the desired focal position 1 is focused to point P$_1$ by the lens system 2 and is also focused to point P$_2$ by the unidirectional lens 19 (of a focal length of f$_c$) which is additionally inserted at a leftward distance of B from the point P$_1$. The detector set 21 is disposed at a rightward distance of D from the point P$_1$. Then, the distance between the points P$_1$ and P$_2$ is given by $W=B^2/(B+f_c)$. Where the radiation focused to the point P$_2$ by the action of the unidirectional lens 19 is projected on the surface of the detector set 21 to spread by X and the radiation focused to the point P$_1$ without undergoing the action of the unidirectional lens 19 is spread by Y, ratio X/Y is expressed as:

$$X/Y = (1 + B/f_c) \cdot (1 + W/D) = 1 + \frac{B^2 + BD}{Df_c}$$

Figure 21A:
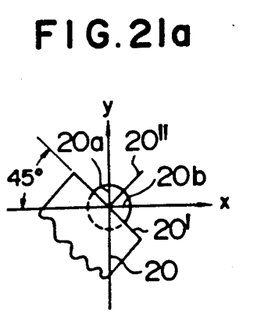

Thus, when a unidirectional lens 19 of an extremely small lens action is used to satisfy $(B^2+BD)<<Df_c$ or when the detector set 21 is disposed at a sufficient rightward distance, the light beam pattern on the detector surface is assumed to be substantially (semi)circular. However, in an apparatus wherein it is difficult to satisfy the above requirements, the photodetector set 21 is adjusted by rotating by a small angle as described below. As shown in FIG. 21a, the shielding element 20 is inserted with its tip edge 20' inclined 45° to X-axis at point Q of FIG. 20 which lies between the points P₁ and P₂ and at which the light beam has a circular cross section. The axis of the unidirectional lens coincides with X-axis. The unshielded portion of the light beam is divided in two, 20a and 20b, by an imaginary line 20". With the shielding element 20 inserted in this way, a light beam pattern formed on the detector surface takes the form of a semi-ellipse 29 wherein the ratio X/Y, where X and Y now correspond to major axis and minor axis of an ellipse, respectively, is determined as described above and projections 29' and 29" of the shielding boundary line and the imaginary line 20" in FIG. 21a are displaced by $\theta$ from lines which make 45° with x and y axes, where $\theta = 45° - \arctan(Y/X)$. When B=20 mm, $f_c$=90 mm and D=30 mm, for instance, then W=3.64 mm, X/Y=1.37 and $\theta$=8.9° result.

Figure 21B:
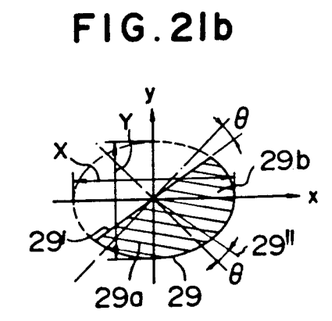

Accordingly, the dark slit 22 in the detector set 21 as explained with reference to FIGS. 8 to 14 is arranged or adjusted to incline by the angle $\theta$ in order to coincide with the line 29" in FIG. 21b.

When applying the present invention to an apparatus wherein the intensity distribution of the detection light beam on its cross section is not isotropic with respect to the central optical axis but symmetric with respect to a line intersecting the central optical axis, the tip edge of the shielding element is required to be aligned with the line of symmetry. Such an apparatus includes, for example, a diffraction type optical disc apparatus.

Figure 22A:
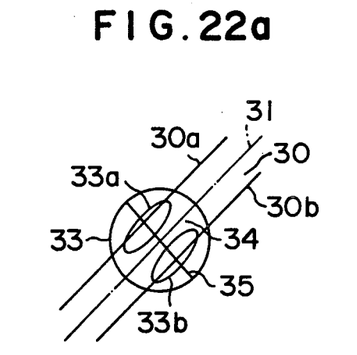
FIGS. 22a to 22c are diagrams to explain the arrangement of an optical element in an optical disc apparatus incorporating the invention.
Figure 22B:
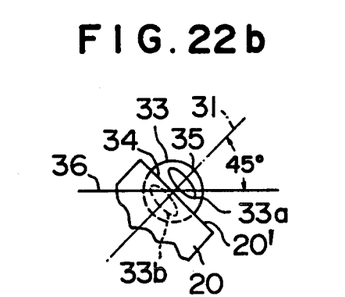
Figure 22C:
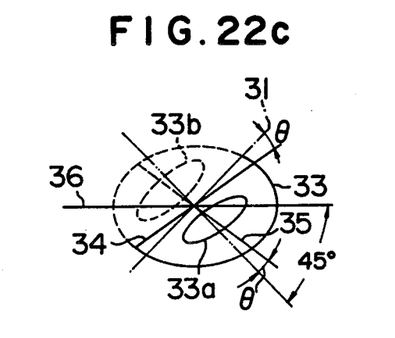

Referring to FIGS. 22a to 22c, the diffraction type optical disc apparatus has raised or recessed channels called tracks, as designated by 30 in FIG. 22a, which are distributed toroidally or concentrically along the rotation direction. Information is recorded on or read out of the track and the light beam must therefore be adjusted such that its focus always coincides with a center line 31 of the track 30. Since the eccentricity of the optical disc causes the track to vibrate and also to be displaced laterally in a direction perpendicular to the focal depth direction, detection and adjustment (called tracking) of the track lateral displacement is required in addition to the focal position detection in the focal depth direction as has been described hereinbefore. The diffraction type track 30 has edges 30a and 30b as shown in FIG. 22a, and the focal position detection light beam transmitted through or reflected from the track 30 contains information regarding the focus and the lateral displacement of the track center 31. More particularly, when an imaginary line 34 coincident with the track center axis and an imaginary line 35 perpendicular thereto are depicted on a cross section 33 of the detection light beam as shown in FIG. 22a, the intensity of light become different at areas 33a and 33b bounded by the line 34 in accordance with a track lateral displacement. The difference in light intensity is symmetrical with respect to the line 35 and the shielding element will therefore be inserted such that its tip edge coincides with the line 35, as mentioned above and as will be described in greater detail. For explanation, the track center axis 31 is taken as a reference. FIG. 22b illustrates the shielding element 20 inserted into the circular cross section 33 of the detection light beam lying between the two foci of the beam (at site Q in FIGS. 18 and 20) when the operating axis 36 of the unidirectional lens makes an angle of 45° with the track center axis 31. Under the influence of insertion of the unidirectional lens, the light intensity distribution rotates through 90° so that the boundary line 34 for the areas 33a and 33b representative of the change in light intensity due to the track lateral displacement makes a right angle with the line 31, and the line 35 with which the change in light intensity is symmetrical coincides with the line 31. When the tip edge 20' of the shielding element is brought into alignment with the line 34, as will readily be seen by making FIGS. 21a and 21b correspondent to FIGS. 22b and 22c, respectively, the line symmetry axis 35 of the change in light intensity appearing in a light beam pattern 33 formed or projected on the photodetector surface deviates by a small angle $\theta$ from the line that is perpendicular to the track center axis 31 as shown in FIG. 22c. As has been explained with reference to FIG. 21b, the angle $\theta$ corresponds to the adjusting angle of inclination of the dark slit in the detector set as required when the detection light beam pattern actually takes the form of an ellipse. The changes in total light intensity due to the track lateral displacement are always equal on both sides of the line 35 and the focal position detecting signal output will therefore remain unchanged in the presence of the track lateral displacement when the dark slit in the photodetector set is so disposed as to coincide with the line 35 shown in FIG. 22c. In this manner, it is possible to form on the optical disc surface a stable focal point image which is unaffected by the track lateral displacement.

Figure 23:
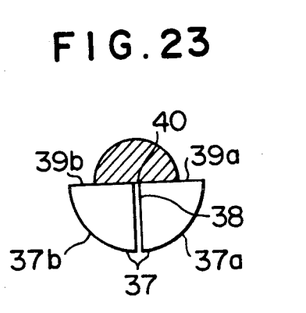
FIG. 23 is a diagram to explain the arrangement of photodetectors in the optical disc apparatus.

In an alternative as shown in FIG. 23, component detectors 37a and 37b of a photodetector set 37 are disposed with their edges 39a and 39b are aligned in line and the center of rotation as designated at 40 of a rotating detection light beam pattern in the form of an approximate semicircle lies on the straight line connecting the edges 39a and 39b and within a dark slit 38 in the detector set. Based on the principle of the present invention and the arrangement of the detector set as shown in FIG. 23, the focal position correction signal output can be obtained from an intended focal position irrespective of the configuration of the light intensity distribution on a cross section of the detection light beam emitted from a focal point to be detected, because the component detectors 37a and 37b will not receive the light beam when the actual focal position coincides with the desired focal position whereas when the actual focal position is displaced from the desired focal position, the light beam pattern rotates to cause one of the component detectors 37a and 37b to receive the light beam in accordance with the amount of displacement. According to the invention incorporating the detector arrangement of FIG. 23, an automatic focusing apparatus for use, for example, in the aforementioned optical disc apparatus can be obtained which is unaffected by the track lateral displacement irrespective of the direction of the track channel.

Figure 24A:
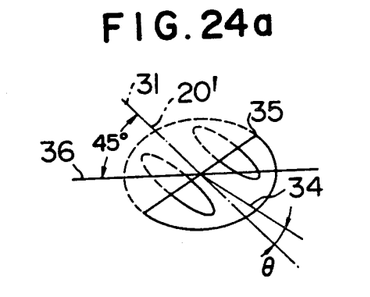
FIGS. 24a and 24b are diagrams to explain another arrangement of the optical element in the optical disc apparatus.
Figure 24B:
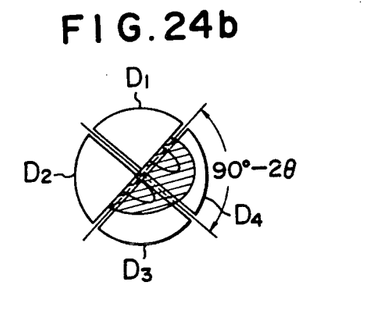

FIG. 24b illustrates another modification of a detector set having four component detectors wherein crucial dark slits subtend an angle of 90°−2$\theta$, where $\theta$ depends on the major/minor axis ratio of the elliptical light beam pattern on the detector set surface as has been explained with reference to FIG. 21b. When a single detector set of the above quartered configuration is applied to the optical disc apparatus, it is possible to obtain two signals for automatic focusing and tracking. To this end, the directional relationship between track channel center 31, operating axis 36 of the unidirectional lens and tip edge 20' of the shielding element is positioned relative to a light beam pattern on the detector set surface as shown in FIG. 24a. The center line 31 coincides with the tip edge 20' and the axis 36 makes an angle of 45° with the line 31 or 20'. In comparison with FIG. 22c, the track channel 31 in FIG. 24a is rotated through 90°, and the boundary line 34 through which the light intensity on the detector surface changes because of the track lateral displacement makes an angle of $90° - 2\theta$ with the line 35 defining the semi-elliptical light beam pattern. Accordingly, by making the line 34 coincident with a dark slit partitioning component detectors $D_3$ and $D_4$ as shown in FIG. 24b, the tracking signal can be obtained which corresponds to the difference between output signals of $D_3$ and $D_4$. As explained with reference to FIG. 23, the automatic focusing signal can also be obtained which corresponds to the difference between output signals of component detectors $D_1$ and $D_2$.

Figure 25:
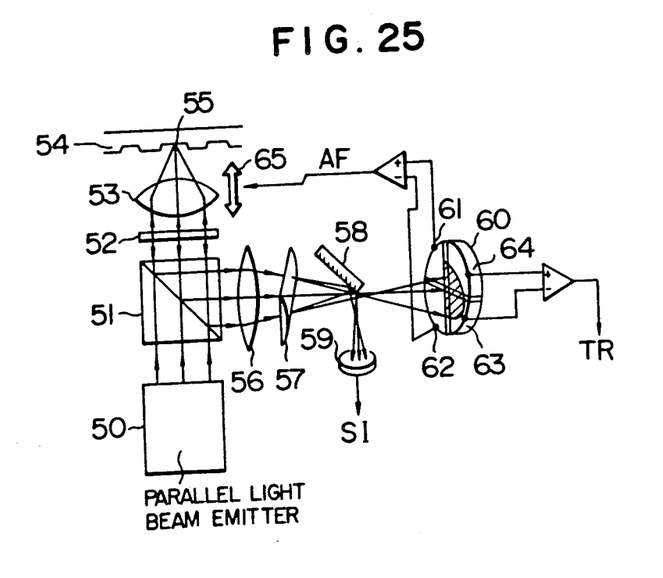
FIG. 25 is a schematic diagram showing an optical disc apparatus embodying the invention.

FIG. 25 illustrates an optical disc apparatus to which the invention is applied. As shown, parallel beams of light emitted from a conventional parallel light beam emitter unit 50 are passed through a polarized beam splitter 51 and a quarter wavelength plate 52 and focused by a lens 53 onto a track 55 of an optical disc 54. Beams of light reflected from the optical disc 54 pass again through the plate 52 and they are reflected at the splitter 51. The thus reflected light beam is focused at two foci by a condensor lens 56 and a cylindrical lens 57 which constitute a light detection system and divided in two by a mirror 58 which is inserted between the two foci until it reaches the optical axis. One of sub-beams of light is received by a photodetector 59 and the other is received by a quartered detector set 60. In this embodiment, since the track channel center axis is perpendicular to the sheet of the drawing, the operating axis of the cylindrical lens makes an angle of 45° with sheet of the drawing, and the tip edge of the mirror is vertical to sheet of the drawing, intensity of sub-beams from the mirror 58 remains unchanged in the presence of the track lateral displacement and an information signal of the optical disc will therefore be derived from the photodetector 59. On the other hand, a difference (AF) between outputs of component detectors 61 and 62 of the quartered detector set 60 as explained with reference to FIG. 24b is applied to a conventional unit adapted to move the lens 53 in directions of arrow 65 in order to accomplish automatic focusing. A difference (TR) between outputs of component detectors 63 and 64 is applied to a conventional unit adapted to move the optical head as a whole or the lens 53 in the direction of the track lateral displacement, thereby accomplishing tracking.

Figure 26:
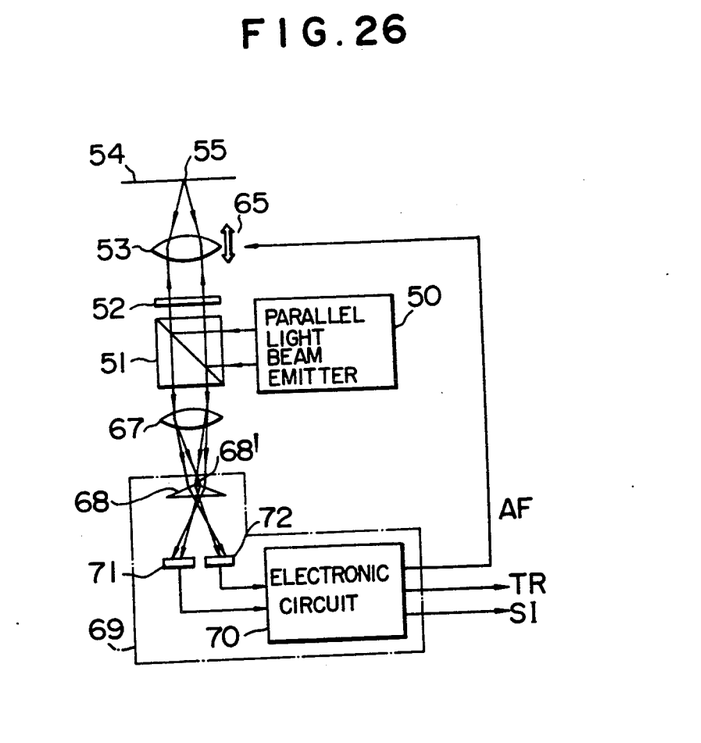
FIG. 26 is a schematic diagram showing another optical disc incorporating the invention.
Figure 27:
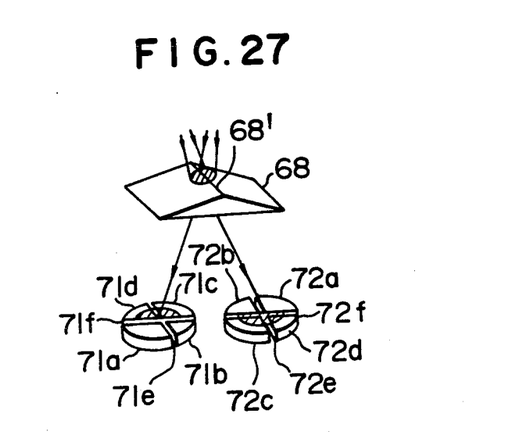
FIG. 27 is a perspective view useful in explaining the manner of taking out signals in the embodiment of FIG. 26.

FIG. 26 shows another embodiment of an optical disc apparatus incorporating the invention. The same elements as those in FIG. 25 will not be described to avoid complexity of explanation. A lens 67 with one spherical surface and the other cylindrical surface has a duplex effect of the lens 56 and cylindrical lens 57 shown in FIG. 25, and it is disposed such that its unidirectional lens axis makes an angle of 45° with the sheet of the drawing. A wedge prism 68 is disposed with its light beam splitting line 68' directed perpendicularly to the sheet of the drawing and the light beam is divided in two by the prism 68, and resulting sub-beams are received by quartered photodetector sets 71 and 72, respectively, and synthesized at an electronic circuit 70 to produce an automatic focusing signal (AF), a tracking signal (TR) and an information signal (SI). The manner of synthesizing the output signals from four component detectors of each of the detector sets 71 and 72 will be described with reference to FIG. 27. Four component detectors 71a, 71b, 71c and 71d of the detector set 71 produce outputs $s_a$, $s_b$, $s_c$ and $s_d$ whereas four component detectors 72a, 72b, 72c and 72d of the detector set 72 produce outputs $t_a$, $t_b$, $t_c$ and $t_d$. When the track channel 55 lies on the sheet of the drawing, the intensity of sub-beams resulting from splitting at the light beam splitting line 68' of the prism 68 changes with the track lateral displacement so that the tracking signal $TR = (s_c + s_d) - (t_c + t_d)$ and the automatic focusing signal $AF = s_a - s_b$, $AF = s_c - s_d$, $AF = t_a - t_b$ or $AF = t_c - t_d$ are established. The automatic focusing signal AF is also given by the sum of any combination of $s_a - s_b$, $s_c - s_d$, $t_a - t_b$ and $t_c - t_d$. The information signal SI is expressed as $SI = s_c + s_d + t_c + t_d$. On the other hand, when the track channel 55 is perpendicular to the sheet of the drawing, the intensity of sub-beams split by the splitting line 68' is unaffected by the track rateral displacement and hence $TR = s_c - s_d$, $TR = t_c - t_d$ or $TR = (s_c - s_d) + (t_c - t_d)$, $AF = s_a - s_b$, $AF = t_a - t_b$ or $AF = (s_a - s_b) + (t_a - t_b)$, and $SI = s_c + s_d + t_c + t_d$ are obtained.

As has been described, the present invention can eliminate difficulties in the selection of the detector dark slit width and accurate setting of the detector set in the conventional detection apparatus as shown in FIG. 1 as well as in accurate setting of the shielding element in the conventional detection apparatus as shown in FIG. 5, and due to the fact that the detection light beam pattern on the detector surface rotates in accordance with changes in the focal position, the invention can advantageously enhance compatibility with the conventional focal position corrector.

What is claimed is:

1. A focal position detecting optical apparatus comprising:
    a first optical system for illumination of a focused light beam onto an object to be irradiated;
    a second optical system disposed in a path of a light beam reflected from or transmitted through the object, said second optical system including first optical means having a unidirectional lens action for condensing the reflected or transmitted light beam and forming focal point images of the light beam at two foci spaced apart from each other, and second optical means disposed between the two foci for extracting a part of the light beam from the first optical means by splitting the light beam along a splitting line; and
    detector means disposed rearwardly of the two foci for detecting a light beam pattern formed by said second optical system, the light beam pattern being rotated in accordance with the focal position of said first optical system.

2. A focal position detecting optical apparatus according to claim 1, wherein said second optical means is disposed at a site between the two foci at which the light beam has a circular cross section.

3. A focal position detecting optical apparatus according to claim 2, wherein said second optical means is disposed such that said splitting line extends substantially perpendicularly to the optical axis between said two foci.

4. A focal position detecting optical apparatus according to claim 2, wherein said second optical means is disposed such that said splitting line extends so as to deviate from an operating axis of the unidirectional lens action of said first optical means and from an axis perpendicular to the operating axis.

5. A focal position detecting optical apparatus according to claim 4, wherein said second optical means is disposed such that said splitting line makes an angle of approximately 45° with the unidirectional lens operating axis of said first optical means.

6. A focal position detecting optical apparatus according to claim 1, wherein said second optical means comprises a light shielding element which blocks off the other part of the light beam.

7. A focal position detecting optical apparatus according to claim 1 wherein said second optical means comprises a splitting element which divides the light beam into two halves.

8. A focal position detecting optical apparatus according to claim 1 wherein said detector means comprises at least two photodetectors in substantially symmetrical relationship with respect to a dark slit lying in substantially the same direction as said splitting line of said second optical means, and means for producing a signal representative of the difference between outputs of the two photodetectors.

9. A focal position detecting optical apparatus according to claim 8 wherein said two photodetectors are disposed such that the light beam pattern formed by said second optical system is received by said two photodetectors with the same amount of light where the focal position of said first optical system is at a desired position.

10. A focal position detecting optical apparatus according to claim 9, wherein said second optical means is disposed at a site between the two foci at which the light beam has a circular cross section in such a manner that said splitting line makes an angle of approximately 45° with the unidirectional lens operating axis of said first optical means and that the dark slit coincides with an axis rotated to deviate from said splitting line of said second optical means toward a major axis of an imaginary ellipse by an angle $\theta = 45° \text{ arc tan } (Y/X)$, where X represents the major axis of the imaginary ellipse, Y represents a minor axis of the imaginary ellipse, and the imaginary ellipse is a light beam pattern to be formed on the surface of said detectors if said second optical means is removed.

11. A focal position detecting optical apparatus according to claim 8 wherein said two photodetectors are disposed with one peripheral side of one photodetector aligned with that of the other photodetector in such a manner that said dark slit intersects the rotary axis of the light beam pattern formed by said second optical system on a straight line containing said peripheral sides, and that said two photodetectors do not receive the light beam pattern formed by said second optical system when the focal position of said first optical system is at a desired position.

12. An optical disc recording and reproducing apparatus comprising:
a light source;
a rotary memory medium having a plurality of tracks distributed along the rotation direction;
a first optical system for illuminating a light beam from said light source onto a predetermined track on said memory medium;
a second optical system disposed in a path of a light beam reflected from the illuminated track, said second optical system including first optical means having a unidirectional lens action for condensing the reflected light beam and forming focal point images of the light beam at two foci spaced apart from each other, and second optical means disposed between the two foci for extracting a part of the light beam from the first optical means by splitting the light beam along a splitting line;
detector means for detecting a light beam pattern formed by said second optical system; and
control means for controlling the action of said first optical system by the output of said detector means, said first optical means being disposed with its unidirectional lens operating axis making an angle of 45° with the direction of said track, said detector means including at least two photodetectors disposed in the rear of said two foci in the direction of travelling of the light beam and in substantially symmetrical relationship with respect to a dark slit lying in substantially the same direction as said splitting line of said second optical means, said control means including first means for producing the difference between outputs of said two photodetectors and said first optical system including focus adjusting means for adjusting the formation of a focal image of the track illuminating light beam on said memory medium so that the output of said first means controls the action of said focus adjusting means.

13. An optical disc recording and reproducing apparatus according to claim 12 wherein said second optical means is disposed at a site between the two foci at which the light beam has a circular cross section in such a manner that said splitting line extends perpendicularly to the direction of said track.

14. A optical disc recording and reproducing apparatus according to claim 13 wherein said two photodetectors are disposed such that the light beam pattern formed by said second optical system is received by said two photodetectors with the same amount of light when the focal position of the light beam from said first optical system is on the surface of said memory medium.

15. An optical disc recording and reproducing apparatus according to claim 14 wherein said photodetectors are disposed such that said dark slit coincides with an axis rotated to deviate from said splitting line of said second optical means toward a major axis of an imaginary ellipse by an angle $\theta = 45° - \text{arc tan } (Y/X)$, where X represents the major axis of the imaginary ellipse, Y represents a minor axis of the imaginary ellipse, and the imaginary ellipse is light beam pattern to be formed on the surface of said photodetectors if said second optical means is removed.

16. An optical disc recording and reproducing apparatus according to claim 13 wherein said detector means includes first detector means having four photodetectors partitioned by a first dark slit coinciding with an axis rotated to deviate from said splitting line of said second optical means toward a major axis of an imaginary ellipse by an angle $\theta = 45° - \text{arc tan } (Y/X)$, where X represents the major axis of the imaginary ellipse, Y represents a minor axis of the imaginary ellipse, and the imaginary ellipse is a light beam pattern to be formed on the surface of said photodetectors if said second optical means is removed, and by a second dark slit coinciding with an axis rotated to deviate from the direction of said track toward the major axis of the imaginary ellipse by the angle $\theta$, said detector means further including second detector means for receiving another light beam splitted by said second optical means; wherein said first means comprises means for producing the difference between outputs of two photodetectors of said first detector means disposed on one side of the second dark slit; wherein said control means comprises second means for producing the difference between the output of said second detector means and the sum of the outputs of the remaining two photodetectors of said first detector means disposed on the other side; and wherein said first optical system further comprises tracking means for causing the light beam illuminated on said track to effect tracking of said track, the action of said tracking means being controlled by the output of said second means.

17. An optical disc recording and reproducing apparatus according to claim 12 wherein said second optical means is disposed at a site between the two foci and at which the light beam has a circular cross section in such a manner that said splitting line is parallel with the direction of said track; wherein said detector means includes four photodetectors partitioned by a first dark slit coinciding with an axis rotated to deviate from an axis perpendicular to the direction of said track toward a major axis of an imaginary ellipse by an angle $\theta = 45° - \arctan(Y/X)$, where X represents the major axis of the imaginary ellipse, Y represents a minor axis of the imaginary ellipse, and the imaginary ellipse is a light beam pattern to be formed on the surface of said photodetectors if said second optical means is removed, and by a second dark slit coinciding with an axis rotated to deviate from the direction of said track toward the major axis of the imaginary ellipse by the angle $\theta$; wherein said first means comprises means for producing the difference between outputs of two photodetectors disposed on one side of the first dark slit; wherein said control means comprises second means for producing the difference between outputs of the remaining two photodetectors disposed on the other side; and wherein said first optical system further comprises tracking means for causing the light beam illuminated on said track to effect tracking of said track, the action of said tracking means being controlled by the output of said second means.

18. An optical disc recording and reproducing apparatus according to claim 12, wherein the light beam pattern formed by said second optical system rotates about a rotary axis in accordance with the focal position of said first optical system, said two photodetectors being disposed with one peripheral side of one photodetector aligned with that of the other photodetector in such a manner that said dark slit intersects the rotary axis of the light beam pattern on a straight line containing said peripheral sides, and that said two photodetectors do not receive the light beam pattern when the focal position of said first optical system is at a desired position.

19. An optical disc recording and reproducing apparatus according to claim 13, wherein the light beam pattern formed by said second optical system rotates about a rotary axis in accordance with the focal position of said first optical system, said two photodetectors being didposed with one peripheral side of one photodetector sligned with that of the other photodetector in such a manner that said dark slit intersects the rotary axis of the light beam pattern on a straight line containing said peripheral sides, and that said two photodetectors do not receive the light beam pattern when the focal position of said optical system is at a desired position.

20. An optical disc recording and reproducing apparatus according to claim 12, wherein the light beam pattern formed by said second optical system rotates about a rotary axis in accordance with the focal position of said first optical system, said second optical means being disposed at a site at which the light beam has a circular cross section in such a manner that said splitting line is parallel with the direction of said track, said two photodetectors being disposed with one peripheral side of one photodetector aligned with that of the other photodetector in such a manner that said dark slit intersects the rotary axis of the light beam pattern on a straight line containing said peripheral sides, and that said two photodetectors do not receive the light beam pattern when the focal position of said first optical system is at a desired position.

* * * * *